US008589901B2

(12) United States Patent
Lin et al.

(10) Patent No.: US 8,589,901 B2
(45) Date of Patent: Nov. 19, 2013

(54) SPECULATIVE REGION-LEVEL LOOP OPTIMIZATIONS

(75) Inventors: Jin Lin, San Jose, CA (US); John L. Ng, San Jose, CA (US); Robert J. Cox, Mountain View, CA (US); Xinmin Tian, Union City, CA (US)

(73) Assignee: Edmund P. Pfleger, Santa Clara, CA (US)

( * ) Notice: Subject to any disclaimer, the term of this patent is extended or adjusted under 35 U.S.C. 154(b) by 355 days.

(21) Appl. No.: 12/976,463

(22) Filed: Dec. 22, 2010

(65) Prior Publication Data

US 2012/0167068 A1 Jun. 28, 2012

(51) Int. Cl.
*G06F 9/45* (2006.01)

(52) U.S. Cl.
USPC .......................................................... 717/160

(58) Field of Classification Search
None
See application file for complete search history.

(56) References Cited

U.S. PATENT DOCUMENTS

| 5,842,022 | A * | 11/1998 | Nakahira et al. | 717/160 |
|---|---|---|---|---|
| 6,038,398 | A * | 3/2000 | Schooler | 717/160 |
| 7,603,546 | B2 | 10/2009 | Narayanasamy et al. | |
| 2001/0044930 | A1 * | 11/2001 | Miyata et al. | 717/9 |
| 2005/0144602 | A1 | 6/2005 | Ngai et al. | |
| 2006/0048122 | A1 * | 3/2006 | Barton et al. | 717/160 |
| 2008/0127146 | A1 | 5/2008 | Liao et al. | |
| 2008/0244512 | A1 * | 10/2008 | Guo et al. | 717/110 |
| 2009/0307674 | A1 | 12/2009 | Ng et al. | |
| 2012/0117552 | A1 | 5/2012 | Krishnaiyer et al. | |
| 2012/0167069 | A1 | 6/2012 | Lin et al. | |

OTHER PUBLICATIONS

Ted Zhihong Yu, Edwin H.-M. Sha, Nelson Passos, Roy Dz-ching Ju, Algorithms and Architecture Support for Pipelining and Scheduling Nested Loops with Conditions (1997), retrieved from http://citeseerx.ist.psu.edu/viewdoc/similar?doi=10.1.1.45.3083 &type=ab on Feb. 28, 2013.*
Boulet, et al., "Loop Parallelization algorithms: From Parallelism extraction to code generation", Parallel Computing vol. 24, 1998, 24 pages.
Knobe, et al., "Array SSA Form and its use in Parallelization", POPL 98, 14 pages.
Gupta, et al., "Techniques for Speculative Run-Time Parallelization of Loops", 1998 ACM/IEEE Conference on Supercomputing, 1998, 12 pages.
International Search Report and Written Opinion for related PCT Application No. PCT/US2011/065948, Jul. 18, 2012, 11 pages.
Ng, et al., "Inter-procedural Loop Fusion, Array Contraction and Rotation," Proceedings of the 12th International Conference on Parallel Architectures and Compilation Techniques (PACT'03).

(Continued)

*Primary Examiner* — Philip Wang
(74) *Attorney, Agent, or Firm* — Grossman, Tucker, Perreault & Pfleger, PLLC

(57) ABSTRACT

A system and method are configured to apply region level optimizations to a selected region of source code rather than loop level optimizations to a loop or loop nest. The region may include an outer loop, a plurality of inner loops and at least one control code. If the region includes an exceptional control flow statement and/or a procedure call, speculative region-level multi-versioning may be applied.

17 Claims, 3 Drawing Sheets

(56) References Cited

OTHER PUBLICATIONS

Hank, et al., "Region-Based Compilation: An Introduction and Motivation," International Journal of Parallel Programming, 25(2):113-146, Apr. 1997.

Liu, et al., "A Region-Based Compilation Infrastructure," In Proceedings of the Seventh Workshop on Interaction between Compilers and Computer Architectures, 2003.

International Preliminary Report on Patentability received for PCT Patent Application No. PCT/US2011/065948, mailed on Jul. 4, 2013, 7 pages.

Non-Final Office Action received for U.S. Appl. No. 12/978,465, mailed on Jul. 17, 2013, 20 pages.

Baghdadi, et al., "The Potential of Synergistic Static, Dynamic and Speculative Loop Nest Optimizations for Automatic U Parallelization", PESPMA 2010, Saint-Malo, France, Jun. 22, 2010, pp. 54-58.

Du, et al., "A Cost-Driven Compilation Framework for Speculative Parallelization of Sequential Programs", 2004 ACM, PLDI'04, Washington, DC, USA, Jun. 9-11, 2004, pp. 71-81.

Barton, et al., "Generalized Index-Set Splitting", Department of Computer Science, Springer-Verlag Berlin Heidelberg 2005, CC 2005, LNCS 3443, 2005, pp. 106-120.

\* cited by examiner

SPECULATIVE REGION-LEVEL LOOP OPTIMIZATIONS

FIELD

The disclosure relates to speculative region-level loop optimizations.

BACKGROUND

Multi-core platforms may pose challenges to achieving good scaling while running multiple copies of memory access intensive applications. Memory access intensive applications may lead to a memory bandwidth contention and poor scaling, as the memory bandwidth is saturated resulting in lower throughput performance, especially for processors with hyperthreading enabled. These challenges have been tackled with a set of compiler optimizations configured to improve data locality and to reduce memory access traffic. The set of compiler optimizations includes loop interchange, loop fusion and loop blocking, and are configured to enhance performance by improving data-locality and reducing memory access traffic.

A conventional loop optimization technique may be applied to a single loop nest in order to improve memory locality and thus increase the throughput performance. A chain of loop nests where the loops are separated by the control codes may inhibit application of optimizing techniques because of the control code.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, the present disclosure describes a system and method configured to apply region level optimizations to a selected region of source code rather than loop level optimizations to a loop or loop nest. The region may include an outer loop, a plurality of inner loops and at least one control code. The control code may separate the inner loop from the outer loop. Control code corresponds to code that may be executed if a condition is met. For example, control codes include if statements (including if-else statements), switches and/or computed go to statements.

If the region satisfies a set of criteria including, e.g., no exceptional control flow statements and no procedure calls, as described herein, region-level loop blocking may be performed. Region-level loop blocking may utilize a region-level blocking factor determined based, at least in part, on respective blocking factors associated with respective inner loops.

If the region includes an exceptional control flow statement and/or a procedure call, speculative region-level multi-versioning may be applied. As a result, a speculative version and an original version of the code region may be produced. The speculative version may be executed based, at least in part, on a condition expression evaluated at runtime.

The region level optimizations may be performed in an early compiler phase and may expose more opportunity for optimization in a later phase. The optimizations are configured to improve runtime execution by, e.g., reducing processing time and/or reducing memory bandwidth contention and/or memory bandwidth saturation by efficiently using cache memory. The region level optimizations may further exploit data locality by allowing loop optimizations that cross control code(s).

System Architecture

Figure 1:
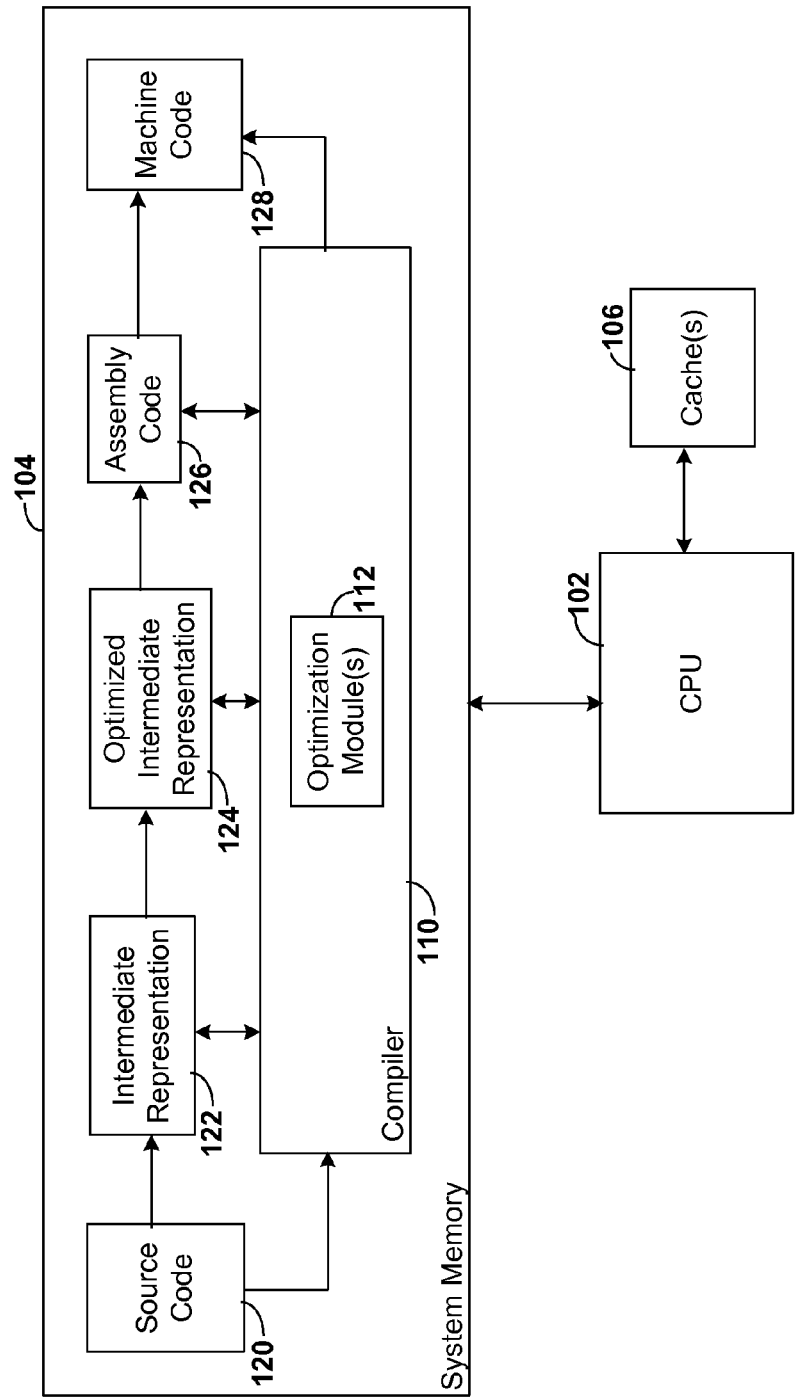
FIG. 1 illustrates one example system embodiment consistent with the present disclosure.

FIG. 1 illustrates one example system 100 embodiment consistent with the present disclosure. The system 100 includes a central processing unit 102, a system memory 104 and one or more cache(s) 106. The system 100 includes a compiler 110 configured to receive a source code 120, to operate on the source code 120 and to produce an output. The source code may be partitioned into a plurality of different categories, including but not limited to, loops, if-blocks and/or blocks of straight line code. The output may include assembly code 126 and/or machine (i.e., executable) code 128. The compiler 110 may include one or more optimization module(s) 112 configured to determine a candidate region for region-level optimizations, as described herein.

For example, the source code 120 may include a computer program written in a relatively high level programming language. The compiler 110 may include a front end and a back end and may include a middle end that overlaps an intersection of the front end and the back end. The compiler 110 is configured to receive the source code 120. The compiler 110 (e.g., front end) is then configured to check syntax and/or semantics of the source code 120 and to generate an intermediate representation 122 corresponding to the source code 120.

Continuing with this example, the compiler 110 (e.g., middle end) is configured to process the intermediate representation 122. The processing may be performed in multiple passes and/or multiple phases and may include one or more optimizations. The optimizations may be configured to enhance runtime performance of the corresponding machine code 128. Optimizations may include removal of useless or unreachable code, discovering and propagating constant values, relocation of a computation to a less frequently executed location, e.g., out of a loop, and specializing a computation based on a context.

Optimizations may further include loop blocking and/or loop parallelization. Loop blocking is configured to reduce loop execution time. For example, loop blocking may reduce data access time in a loop structure by, e.g., optimizing cache usage. Decreasing data access time may result in an overall reduction in processing time. Loop parallelization is configured to combine a plurality of loops with a similar trip count (i.e., passes) into a single loop. In other words, each of a plurality of loops may include a loop statement and a loop body. In loop parallelization, the loops may be combined into a parallelized loop that includes one loop statement and the parallelized loop body may include the plurality of loop bodies.

As a result of the optimization(s), the compiler may generate an optimized intermediate representation 124 of the source code 120. The compiler 110 (e.g., back end) is configured to generate assembly code 126 corresponding to the optimized intermediate representation 124 of the source code 120. In some embodiments, the compiler 110 may be configured to then generate machine code 128 based, at least in part, on the assembly code. The machine code 128 may be configured to be executed on a particular processor.

Accordingly, the system 100 (including compiler 110) is configured to convert the source code 120 into assembly code 126 and/or machine code 128. Optimizations may be performed by, e.g., optimization module(s) 112, and may be performed in multiple passes and/or multiple compiler phases. The optimizations are configured to improve a runtime performance parameter, e.g., memory accesses, processing time, and/or memory bandwidth.

Exemplary Methodology

Figure 2:
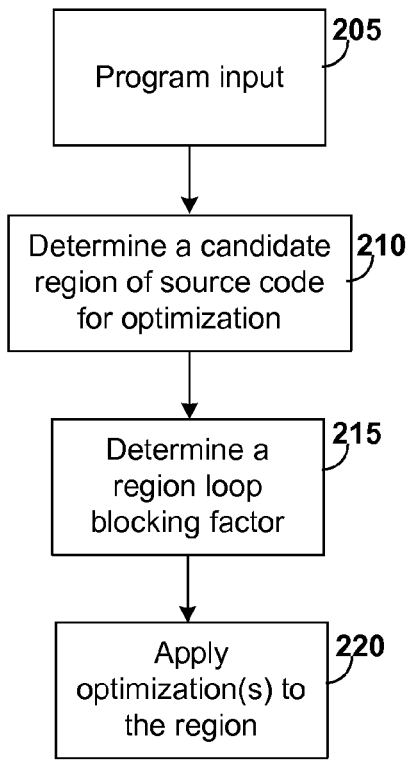
FIG. 2 illustrates a flow chart of example operations for region-level loop optimizations consistent with the present disclosure.

FIG. 2 illustrates a flow chart 200 of example operations for region-level loop optimization, consistent with the present disclosure. The operations illustrated in this embodiment may be performed by circuitry and/or software modules associated with a system (e.g., system 100). Table 1 includes one example of program code that illustrates region-level loop optimization (e.g., region-level loop blocking), corresponding to flow chart 200 of FIG. 2. Column (a) of Table 1 includes an example source code region and Column (b) of Table 1 includes a corresponding optimized code region after performing region-level loop blocking, consistent with the present disclosure.

TABLE 1

| for (i=0;i<n;i++) { <br>   if (cond1 & (1<<i)) { <br>     for (j=0;j<m;j++) { <br>       a[j]=0; <br>     } <br>   } <br>   else { <br>     for (j=0;j<m;j++) { <br>       a[j]=0; <br>     } <br>   } <br> } | for (jj=0;jj<m/NN;jj++) { <br>   for (i=0;i<n;i++) { <br>     if (cond1 & (1<<i)) { <br>       for (j= jj*NN;j< min(m, <br>       jj*NN+NN);j++) { <br>         a[j]=0; <br>       } <br>     } <br>     else { <br>       for (j= jj*NN;j< min(m, <br>       jj*NN+NN);j++) { <br>         a[j]=0; <br>       } <br>     } <br>   } <br> } |
|---|---|
| (a) source code | (b) the output of region based loop blocking |

The source code region of Table 1 includes an outer loop (for (i=0; i<n; i++)), two inner loops (for (0=0; j<m; j++)) and control code (if (cond1 & (1<<i))) separating the outer loop and the inner loops. In this example, the control code corresponds to an if-else structure. The source code region of Table 1 corresponds to an imperfect loop nest because of the control code. A perfect loop nest may not include a control code separating an outer loop from an inner loop, and loop level optimizations (e.g., loop blocking) may be applied, as will be understood by those skilled in the art.

A first inner loop corresponds to a IF portion of the if-else structure and a second inner loop corresponds to an ELSE portion of the if-else structure. The inner loops are configured such that if the expression in the control code is true, the first inner loop (IF portion) is executed, otherwise the second inner loop (ELSE portion) is executed. The inner loops are each configured to access an array a, each pass, j, through the respective inner loop. For each pass (corresponding to index i) through the outer FOR loop, m locations in array a, may be accessed. Accordingly, there exists temporal locality for each element a[j] of array a, i.e., each element, a[j], of array a may be accessed n times (the number of passes through the outer loop). It may therefore be desirable to apply an optimization, e.g., region-level loop blocking, to the source code region of Table 1, to exploit this temporal locality.

Flow may begin with program input 205. For example, the program input 205 may correspond to an intermediate representation 122 of the source code 120 that includes the source code region of Table 1. The source code may be partitioned into a plurality of different categories, including but not limited to, loops, if-blocks and/or blocks of straight line code. Operation 210 includes determining a candidate region of source code for region-level loop optimization. For example, the candidate region may include an outer loop and a plurality of inner loops separated by control code.

Operation 210 may include determining the candidate region of source code based, at least in part, on a set of criteria. Each criterion in the set may be independent from each other criterion in the set. The set of criteria may include that there exist no procedure calls and there exist no exceptional control flow statements (e.g., return, abort, exit and/or break) in the inner loops, data accessed in a first inner loop may be accessed in a second inner loop (i.e., an array of data used by the first inner loop may be used by the second inner loop), a total number of passes (i.e., trip count) through a first inner loop may equal a total number of passes through a second inner loop and/or it would be legal to fuse the plurality of inner loops into one loop if the inner loops were adjacent to each other (i.e., if the control code was not present). The set of criteria may include that a depth from the outer loop to each inner loop may equal a depth from the outer loop to each other inner loop in the candidate region and there exists no loop carried dependence between the outer loop and the inner loops. Loop carried dependencies include read-after-write, write-after-read and write-after-write dependencies. If there are no loop carried dependencies, it may be legal to perform loop interchange between the outer loop and the inner loops. In some situations, a compiler, e.g., compiler 110, may assume that a pseudo-loop (with trip count 1) exists enclosing the candidate region.

For example, the source code region of Table 1 may be determined to be a candidate region for region-level loop optimization, based at least in part, on the set of criteria. In this example, each inner loop (i.e., one in the IF portion and the other in the ELSE portion) includes a FOR loop that is configured to assign a value (zero) to m locations in the array a. There exist no procedure calls and no exceptional flow controls in the inner loops. Data (i.e., array a) accessed in the first inner loop is accessed in the second inner loop. The total number of passes through the first inner loop (i.e., m) equals the total number of passes through the second inner loop. It would be legal to fuse the plurality of inner loops into one loop if the inner loops were adjacent to each other, based on loop fusion criteria known to those skilled in the art. The depth from the outer loop to the first inner loop equals the depth from the outer loop to the second inner loop. There exists no loop carried dependence between the outer loop and the inner loops. Accordingly, it is legal to perform loop interchange between the outer loop and the inner loops. The compiler 110 may assume that a pseudo-loop (with a trip count of 1) exists enclosing the candidate region.

A region loop blocking factor may be determined at operation 215. For example, operation 215 may include determining a loop blocking factor for each inner loop in the region. A loop blocking factor is used to break its associated loop into "chunks" where each chunk corresponds to a number of passes through the loop and each chunk is less than the trip count of the associated loop. The loop blocking factor may typically be determined for a loop based on minimizing and/or reducing a cost function. For example, the cost function may correspond to loop execution time. The cost function may be based, at least in part, on cache usage, cache architecture, characteristics of the loop and/or characteristics of operations in the loop (e.g., operations associated with matrix multiplications).

The region loop blocking factor may be determined based, at least in part, on the loop blocking factors determined for each inner loop. For example, the region loop blocking factor may correspond to an average of the loop blocking factors of the inner loops. For example, in the optimized code region of Table 1, the region loop blocking factor is NN.

Optimization(s) may be applied at operation 220. For example, operation 220 may include region level loop blocking. Region level loop blocking may include breaking each inner loop in the region into a first blocking loop and a second blocking loop, where the first blocking loop is outer relative to the second blocking loop. For example, each inner loop (for (j=0; j<m; j++)) in the source code of Table 1 may be broken into a first blocking loop (for (jj=0; jj<m/NN; jj++)) and a second blocking loop (for (j=jj*NN; j<min(m, jj*NN+NN); j++)).

Operation 220 may further include performing a region level loop interchange between the outer loop and each first blocking loop corresponding to a respective inner loop. As a result of the region level loop interchange, the optimized code region may include a region outer loop corresponding to the first blocking loop (i.e., for (jj=0; jj<m/NN; jj++)). The region outer loop has a loop trip count that is a function of the region loop blocking factor, NN, determined at operation 215. The region outer loop encloses the outer loop, inner loop and control code of the input source code region. The trip counts of the inner loops in the optimized region correspond to the second blocking loop and, therefore, the loop blocking factor NN.

In this manner, the outer loop, inner loops and condition code structure of the source code region are preserved in the optimized region. The region outer loop has been added and the trip counts of the inner loops correspondingly updated in order to minimize a cost function, e.g., loop execution time. For example, minimizing loop execution time may be based, at least in part, on optimizing cache usage and thereby reduce memory bandwidth contention (i.e., region level loop blocking).

Referring to Table 1 and comparing the source code region and the optimized code region, the optimized code region includes the region outer loop (for (jj=0; jj<m/NN; jj++)) enclosing the outer loop of the source code region. The region outer loop is configured to facilitate performing all of the operations corresponding to the outer loop of the source code region (for(i=0; i<n; i++)) on a block of array a. The operations corresponding to the outer loop (and inner loops) of the source code region may then be performed for each block (i.e., NN) of array a. In this manner, data (i.e., each block of elements of array a) may be reused, region execution time may be reduced and memory access traffic may be reduced.

The optimized code region of Table 1 may expose opportunities for further optimization in, e.g., a later compiler phase. For example, the region outer loop may be further optimized with loop parallelization.

Accordingly, region level loop blocking may be applied to a candidate region of code that includes an outer loop, a plurality of inner loops and control code. The control code may separate the outer loop and the inner loops. Whether a region of code is a candidate for region level loop blocking may be determined based, at least in part, on a set of criteria, as described herein. The set of criteria includes a criterion that a candidate region may not include procedure call(s) and/or exceptional control flow statement(s). It may be desirable to perform a region level optimization on a region that includes procedure call(s) and/or exceptional control flow statement(s).

Speculative region-level multi-versioning may be implemented, e.g., when opportunities for region-level loop optimizations may not be exposed without speculation. For example, speculative region level multi-versioning may be implemented when a region violates a criterion of the set of criteria as described herein with respect to operation 210. The region may include an outer loop, a plurality of inner loops and a plurality of control codes. At least one control code may separate the outer loop and the plurality of inner loops. The inner loops may be separated by another of the plurality of control codes. The region may include procedure call(s) and/or exceptional control flow statement(s). Exceptional control flow statements may include return, abort, exit and/or break. The procedure calls and/or exceptional control flow statements may prevent region-level loop blocking, as described herein with respect to FIG. 2.

The control codes may include a loop variant control flow statement (e.g., a conditional statement including a loop variant condition expression). A loop variant condition expression corresponds to an expression that may vary (change) with an iteration of a loop. In contrast, loop invariant corresponds to an expression that is either true before a first loop iteration and remains true after each iteration or is false before a first loop iteration and remains false after each iteration. For example, the loop variant control flow statement may separate the outer loop and the inner loops.

An inner loop may execute or the procedure call and/or exceptional control flow statement may execute at runtime depending on a state (e.g., true or false) of the loop variant condition expression. Region-level loop optimizations may be predicated on the inner loop executing. In other words, region level loop optimizations, as described herein, are configured to optimize loops. It may therefore be desirable to speculatively assume that the inner loop will execute, providing an opportunity for region-level loop optimizations, as described herein. A fall back to the original code may be provided to account for an alternative (i.e., the procedure call and/or exceptional control flow statement execute(s)), based on a state of an actual loop variant condition expression at run time. Multi-versioning is configured to provide a speculative version that may be optimized at a later compiler phase and the original version that includes the procedure calls and/or exceptional control flow statements. A multi-version control code (e.g., conditional statement) may be provided that is configured to cause the speculation version or the original version to execute based, at least in part, on a state of the multi-version control code condition expression.

Speculative region-level multi-versioning may be performed relatively early in the compiling process. During later phases, the speculative version may be optimized (e.g., using region-level loop blocking, as described herein). In this manner, region-level speculative multi-versioning is configured to expose more opportunity for compiler optimizations for regions that might not otherwise be optimized because of the procedure call, the exceptional control flow statement(s) and/or loop variant control flow expression(s).

Figure 3:
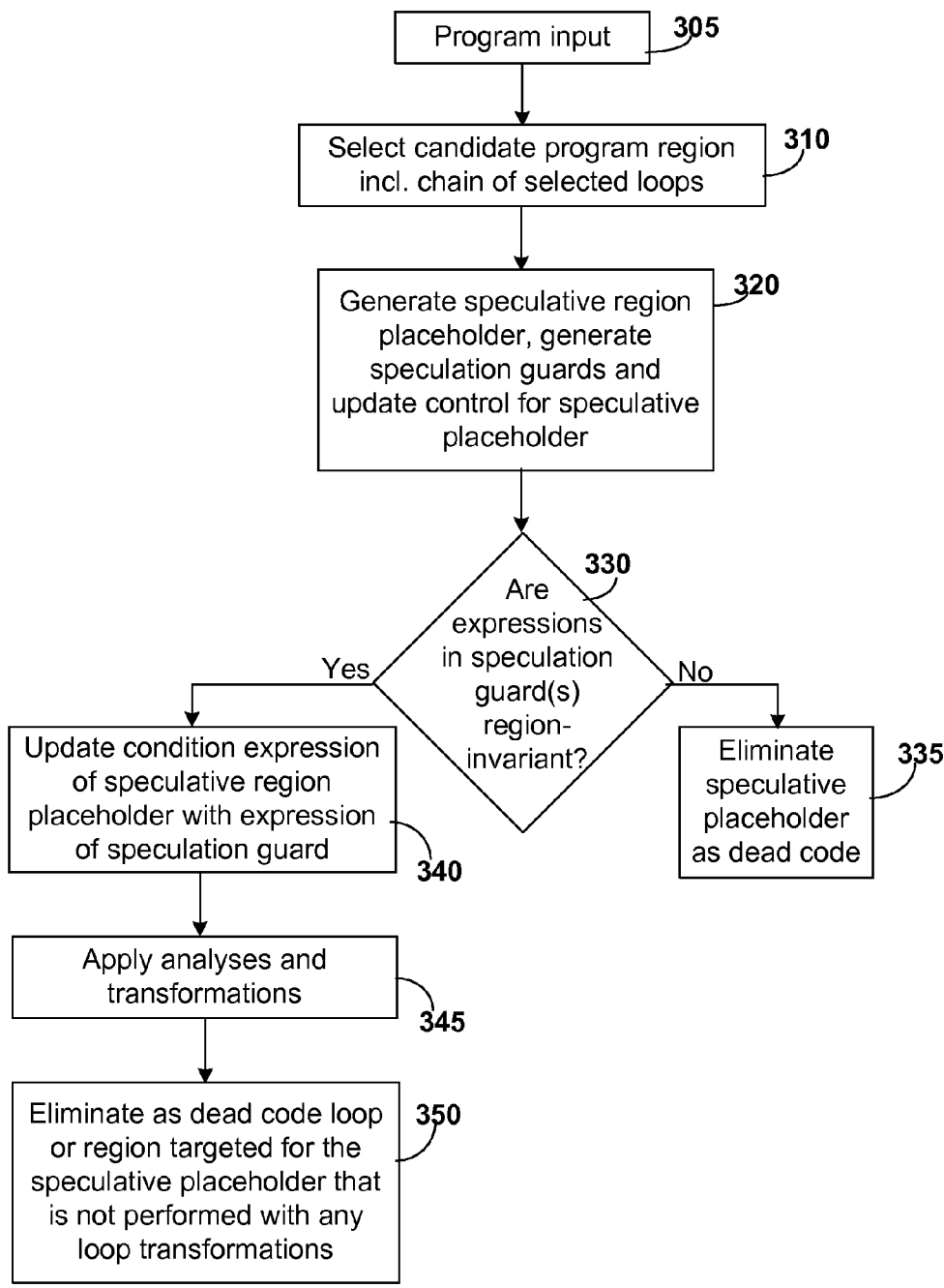
FIG. 3 illustrates a flow chart of example operations for speculative region-level multi-versioning consistent with the present disclosure.

FIG. 3 illustrates a flow chart 300 of example operations for speculative region-level multi-versioning, consistent with the present disclosure. The operations illustrated in this embodiment may be performed by circuitry and/or software modules associated with a system (e.g., system 100), as described herein. At least a portion of the operations illustrated in flow chart 300 may be performed relatively early in a compiler phase to facilitate later optimizations.

Table 2 includes one example of program code that illustrates speculative region-level multi-versioning, corresponding to flow chart 300 of FIG. 3. Column (a) of Table 2 includes an example source code region. Column (b) includes an original version and a speculative region placeholder including a multi-version control code (including a speculative condition expression), a temporary speculative version of the source code region and a speculation guard. Column (c) includes the multi-version control code (updated with the condition expression from the speculation guard), the original version and the speculative version. At runtime, the multi-version control code is configured to cause the speculative version or the original version to execute based on a state of the multi-version control code condition expression.

outer loop, if condition expression cond2 is true, a first inner loop (i.e., for(j=0; j<m; j++)) may execute and if condition expression cond2 is false, the branch is taken so that the procedure call (foo( )) or the exceptional control flow statement (return) may execute (depending on the third control code if (cond3)). Since the condition expression cond2 may be loop variant, i.e., may change for different iterations of the outer loop, whether the first inner loop executes may not be knowable at compile time. Without region-level speculative multi-versioning, a region-level optimization, e.g., region-level loop blocking, is unlikely to be performed on the source code of Table 2 because of the procedure call and/or the exceptional control flow statement and the loop variant condition expression.

Flow may begin with program input 305. For example, the program input 305 may correspond to an intermediate representation 122 of the source code 120 that includes the source code region of Table 2. Operation 310 includes selecting a

TABLE 2

| (a) source code | (b) the generation of speculative version place holder and speculation guard | (c the output after the branch condition is updated with cond2 since cond2 is determined with loop invariant in speculative version |
|---|---|---|
| ```
for (i=0;i<n;i++) {
  if (cond1 & (1<<i)) {
    if (cond2)
      for (j=0;j<m;j++) {
        a[j]=0;
      }
    else {
      if (cond3)
        return;
      foo( );
    }
  }
  else {
    for (j=0;j<m;j++) {
      a[j]=0;
    }
  }
}
``` | ```
if (mis_speculation_flag) {
  for (i=0;i<n;i++) {
    if (cond1 & (1<<i)) {
      ctrl_guard_true (cond2);
      for (j=0;j<m;j++) {
        a[j]=0;
      }
    }
    else {
      for (j=0;j<m;j++) {
        a[j]=0;
      }
    }
  }
}
else {
  for (i=0;i<n;i++) {
    if (cond1 & (1<<i)) {
      if (cond2)
        for (j=0;j<m;j++) {
          a[j]=0;
        }
      else {
        if (cond3)
          return;
        foo( );
      }
    }
    else {
      for (j=0;j<m;j++) {
        a[i]=0;
      }
    }
  }
}
``` | ```
if (cond2) {
  for (i=0;i<n;i++) {
    if (cond1 & (1<<i)) {
      for (j=0;j<m;j++) {
        a[j]=0;
      }
    }
    else {
      for (j=0;j<m;j++) {
        a[j]=0;
      }
    }
  }
}
else {
  for (i=0;i<n;i++) {
    if (cond1 & (1<<i)) {
      if (cond2)
        for (j=0;j<m;j++) {
          a[j]=0;
        }
      else {
        if (cond3)
          return;
        foo( );
      }
    }
    else {
      for (j=0;j<m;j++) {
        a[j]=0;
      }
    }
  }
}
``` |

The source code region of Table 2 includes an outer loop (i.e., for(i=0; i<n; i++)) and a plurality of inner loops (i.e., for(j=0; j<m; j++)). The source code region of Table 2 further includes a plurality of control codes, i.e., if (cond1 & 1<<i)), if (cond2) and if (cond3), corresponding to a first, second and third control code, respectively. The source code region of Table 2 further includes a procedure call (i.e., foo( )) and an exceptional control flow statement (i.e., return). Whether a branch is taken that includes the procedure call and the exceptional control flow statement depends on the second control code (i.e., if (cond2)) and condition expression cond2 may be loop variant. In other words, at run time, for a pass through the candidate program region for region-level speculative multi-versioning. For example, a compiler, e.g., compiler 110, may be configured to select a candidate program region that is anticipated to be "profitable" for speculative loop optimization. Whether the candidate program region is anticipated to be profitable for speculative loop optimization may be based, at least in part, on control-flow analysis, optimization heuristics and/or profiling information. The selected candidate region may be single entry and multiple exit. Control and data flow analysis may be performed on the intermediate representation 122 at operation 310. Operation 310 may further include performing data dependence analysis. The operations 310 are configured to determine one or more code regions that may benefit from speculative multi-versioning, as described herein.

For example, the source code region of Table 2 may be selected as a candidate region for region-level speculative multi-versioning. Region-level loop blocking may be inhibited for the source code region of Table 2 due to the procedure call (i.e., foo( )), and/or the exceptional control flow statement (i.e., return), and the second control code (if (cond2)) because of its loop variant condition expression. The source code region of Table 2 would be a candidate for region-level loop blocking if the loop variant condition expression (cond2) evaluated as true at run-time so that the first inner loop would execute and the procedure call and exceptional control flow statement would not execute. In other words, when selecting a candidate region, the compiler may be configured to consider a region where a state of the loop variant condition expression corresponds to execution of a loop or a procedure call (and/or an exceptional control flow statement).

A speculative region placeholder including a speculation guard may be generated at operation 320. The speculative region placeholder includes a temporary speculative version of the candidate program region configured to be analyzed and modified as described herein. The speculative region placeholder may include a multi-version control code including a speculative condition expression configured to indicate a status of the speculation operations, as described herein. Operation 320 may further include updating a control dependence graph. For example, the control dependence graph may be updated to include the speculative region placeholder and the speculation guard.

The multi-version control code, as described herein, is configured as an if-else control structure as illustrated in Column (b) of Table 2. The if-else structure is configured to bound the speculative version and the original version of the candidate program region during at least a portion of the operations of flow chart 300. To make speculation worthwhile, mis-speculation should be relatively rare. Accordingly, the IF condition of the multi-version control code may be set to be highly likely to happen. Because of the explicit if-else structure, later analyses and/or optimizations may treat the multi-version control code as any other relatively highly biased IF-block. In other words, there is no need to distinguish speculative code from non-speculative code during the analyses and optimizations.

The if-else structure is further configured to check whether the speculation is successful or not at runtime. If the speculation is successful (e.g., the assumed state of the second condition expression (i.e., cond2 is true) corresponds to the actual state of the second condition expression at runtime), the speculative version may be executed. Otherwise, the original version may be executed. The multi-version control code is configured to select an original version or a speculative version of the candidate region at run-time based, at least in part, on an actual state of the loop variant condition expression.

Operation 320 may include generating a speculation guard. The speculation guard is configured to preserve speculation information to facilitate generation of a condition expression for the multi-version control code. For example, as illustrated in Column (b) of Table 2, the speculation guard corresponds to ctrl_guard_true(cond2). The speculation guard occupies a location in the temporary speculative version corresponding to the if(cond2) of the original version, i.e., replaces the conditional statement that determines whether the first loop or the program call and/or the exceptional control flow statement execute.

Operation 320 may include updating control for the temporary speculative version of the candidate region of the speculative placeholder. Control and data flow analysis may be applied to the speculative region placeholder. For example, heuristic rules and/or profiling information may be used to update the control for the speculative placeholder by, e.g., eliminating relatively highly unlikely taken branches to restructure the temporary speculative version and/or ignoring relatively low probability data dependencies from optimizations.

For example, as illustrated in Table 2, the branch that included the procedure call (foo( )) and the exceptional control flow statement (return) in the source code region of Column (a) have been eliminated in the code region of Column (b). In other words, this branch is considered to be relatively highly unlikely taken.

Whether the condition expression(s) in the speculation guard(s) are region invariant may be determined at operation 330. For example, the compiler may be configured to analyze the temporary speculative version in the speculative region placeholder to determine whether the condition expression(s) in the speculation guard are region invariant in the temporary version of the candidate program region.

For example, the condition expression cond2 is region variant in Column (a) of Table 2 due to the procedure call foo( ). After the temporary speculative version has been generated (Column (b) of Table 2) and the branch that included foo( ) eliminated, the condition expression cond2 is region invariant for the speculative version since the procedure call foo( ) is removed.

If the expression(s) in the speculation guard(s) are not region invariant in the selected region, the speculative region placeholder(s) may be eliminated as dead code at operation 335. If the expression(s) in the speculation guard(s) are region invariant, the condition expression of the multi-version control code may be updated with the expression of the speculation guard and the speculation guard may be eliminated at operation 340. As a result, multiple versions of the candidate program region may exist including a speculative version and an original version. The speculative version may satisfy the criteria for region level loop blocking, as described herein. Such blocking may be implemented at a later compiler phase.

For example, as illustrated in Table 2, the mis-speculation_flag condition of the multi-version control code illustrated in the code region of Column (b) is replaced with cond2, the loop variant condition expression of the original source code that was determined to be invariant for the speculative region placeholder. Continuing with this example, the speculation guard (ctrl_guard_true(cond2)) illustrated in the code region of Column (b) is eliminated in the code region of Column (c). The speculative version includes an outer loop, a plurality of inner loops and control code, i.e., may be optimized using region level loop blocking as described herein. Whether the speculative version or the original version is executed at runtime is controlled by the multi-version control code including the loop variant expression (cond2) in an if-else structure, as described herein.

Operations 310, 320, 330 and 340 may be performed at a relatively early compiler phase which may expose more candidate regions for region-level loop optimizations including loop blocking and/or loop parallelization, as described herein.

Turning again to FIG. 3, operation 345 may include applying analyses and transformations, including region-level and/or loop optimization(s), to the speculative region and/or the original region. For example, the optimizations may include region-level loop blocking, loop parallelization, loop distribution, loop interchange, loop fusion and/or other loop optimizations, as may be known to those skilled in the art.

If no loop transformations are applied to the speculative region, the region may be eliminated as dead code at operation 350.

Accordingly, speculative region level multi-versioning may be configured to select a code region early in a compiler phase that may be a candidate for optimization. The candidate region may include an outer loop, a plurality of inner loops and a plurality of control codes. The candidate region may include a procedure call and/or an exceptional control flow statement. Whether the procedure call and/or exceptional control flow statement may execute at run time may be based at least in part on a loop variant condition expression.

The compiler may be configured to generate a speculative region placeholder including a multi-version control code, a speculative version and an original version of the candidate program region. The speculative version may be optimized based on one or more assumptions about which branches are most likely to be taken at runtime. The multi-version control code is configured to allow later compiler phases to process the speculative version and/or the original version without distinguishing the speculative version and the original version and to provide a check at runtime whether the assumption(s) are actually true. If the assumptions are true, the speculative version may execute, and, if the assumptions are not true, the original version may execute.

In this manner, speculative region level multi-versioning may generate one or more speculative program regions in an earlier compiler phase that may benefit from loop and/or region level optimizations in a later compiler phase. When applying the optimizations in the later phase, the compiler may be unaware that a region is a speculative region. A multi-version control code and a speculation guard may be provided to ensure that the condition assumed true in generating the speculative region, is region invariant and, at run time, is actually true for the speculative region to execute.

An exemplary system is described herein. Modifications are possible. For example, memory 104 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 104 may comprise other and/or later-developed types of computer-readable memory.

Embodiments of the methods described herein may be implemented in a system that includes one or more storage mediums having stored thereon, individually or in combination, instructions that when executed by one or more processors perform the methods. Here, the processor may include, for example, a central processing unit (e.g., central processing unit 102 of FIG. 1) and/or programmable circuitry. Thus, it is intended that operations according to the methods described herein may be distributed across a plurality of physical devices. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage media may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

According to one aspect there is disclosed a method of region-level loop optimization. The method may include determining a candidate region of source code for region-level loop optimization, the candidate region comprising an outer loop and a plurality of inner loops separated by control code; and applying a region-level loop optimization to the candidate region.

According to another aspect there is disclosed a system, including one or more storage mediums having stored thereon, individually or in combination, instructions that when executed by one or more processors may result in the following operations: determining a candidate region of source code for region-level loop optimization, the candidate region including an outer loop and a plurality of inner loops separated by control code; and applying a region-level loop optimization to the candidate region.

According to yet another aspect there is disclosed an apparatus. The apparatus may include a memory and a processor. The processor may be configured to determine a candidate region of source code for region-level loop optimization, the candidate region including an outer loop and a plurality of inner loops separated by control code; and apply a region-level loop optimization to the candidate region.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A computer-implemented method of region-level loop optimization, the method comprising:
   determining a candidate region of source code for region-level loop optimization, the candidate region comprising an outer loop and a plurality of inner loops separated by control code;
   determining a loop blocking factor for each inner loop in the candidate region wherein the loop blocking factor is configured to minimize a cost associated with executing each inner loop;
   determining a region loop blocking factor based, at least in part, on the loop blocking factors determined for each inner loop in the candidate region;
   applying the region loop blocking factor to each inner loop in the candidate region by breaking each inner loop into blocks corresponding to the region loop blocking factor; and
   performing loop interchange on one or more of the inner loops to create a region of loop optimizations.

2. The method of claim 1 wherein the region loop blocking factor is an average of the loop blocking factors determined for each inner loop.

3. A method of claim 1, further comprising determining whether the candidate region is optimizable based, at least in part on a set of criteria, wherein the set of criteria comprises:
    data accessed in a first inner loop is also accessed in a second inner loop, a total number of passes through the first inner loop equals a total number of passes through the second inner loop, it would be legal to fuse the plurality of inner loops into one loop if the inner loops were adjacent each other, a depth from the outer loop to the first inner loop equals a depth from the outer loop to the second inner loop in the candidate region, and there exists no loop carried dependence between the outer loop and the inner loops, wherein loop carried dependence includes read-after-write, write-after-read and write-after-write dependencies.

4. The method of claim 1, wherein the candidate region is determined speculatively and further comprising generating a speculative version and an original version, corresponding to the candidate region.

5. The method of claim 3, wherein generating the speculative version comprises:
    generating a speculative region placeholder for the candidate region, wherein the speculative region placeholder comprises a multi-version control code;
    generating a speculation guard comprising an expression; and
    updating the multi-version control code with the expression from the speculation guard if the expression is region invariant.

6. The method of claim 1 further comprising performing region level loop parallelization on the inner loops.

7. A system comprising, one or more non-transitory storage mediums having stored thereon, individually or in combination, instructions that when executed by one or more processors result in the following operations comprising:
    determining a candidate region of source code for region-level loop optimization, the candidate region comprising an outer loop and a plurality of inner loops separated by control code;
    determining a loop blocking factor for each inner loop in the candidate region wherein the loop blocking factor is configured to minimize a cost associated with executing each inner loop;
    determining a region loop blocking factor based, at least in part, on the loop blocking factors determined for each inner loop in the candidate region;
    applying the region loop blocking factor to each inner loop in the candidate region by breaking each inner loop into blocks corresponding to the region loop blocking factor; and
    performing loop interchange on one or more of the inner loops to create a region of loop optimizations.

8. The system of claim 7 wherein the region loop blocking factor is an average of the loop blocking factors determined for each inner loop.

9. The system of claim 7, wherein the instructions that when executed by one or more of the processors result in the following operations comprising:
    determining whether the candidate region is optimizable based, at least in part on a set of criteria, wherein the set of criteria comprises:
    data accessed in a first inner loop is also accessed in a second inner loop, a total number of passes through the first inner loop equals a total number of passes through the second inner loop, it would be legal to fuse the plurality of inner loops into one loop if the inner loops were adjacent each other, a depth from the outer loop to the first inner loop equals a depth from the outer loop to the second inner loop in the candidate region, and there exists no loop carried dependence between the outer loop and the inner loops, wherein loop carried dependence includes read-after-write, write-after-read and write-after-write dependencies.

10. The system of claim 7, wherein the candidate region is determined speculatively and further comprising generating a speculative version and an original version, corresponding to the candidate region.

11. The system of claim 10, wherein generating the speculative version comprises:
    generating a speculative region placeholder for the candidate region, wherein the speculative region placeholder comprises a multi-version control code;
    generating a speculation guard comprising an expression; and
    updating the multi-version control code with the expression from the speculation guard if the expression is region invariant.

12. The system of claim 7 wherein the instructions that when executed by one or more of the processors result in the following operations comprising:
    performing region level loop parallelization on the inner loops.

13. An apparatus comprising:
    a memory;
    a processor configured to determine a candidate region of source code for region-level loop optimization, the candidate region comprising an outer loop and a plurality of inner loops separated by control code and the processor further configured to:
    determine a loop blocking factor for each inner loop of the candidate region wherein the loop blocking factor is configured to minimize a cost associated with executing each inner loop;
    determine a region loop blocking factor based, at least in part, on the loop blocking factors determined for each inner loop in the candidate region;
    apply the region loop blocking factor to each inner loop in the candidate region by breaking each inner loop into blocks corresponding to the region loop blocking factor; and
    perform loop interchange on one or more of the inner loops to create a region of loop optimizations.

14. The apparatus of claim 13, wherein the region loop blocking factor is an average of the loop blocking factors determined for each inner loop.

15. The apparatus of claim 13, wherein the processor is further configured to determine whether the candidate region is optimizable based, at least in part on a set of criteria, wherein the set of criteria comprises:
    data accessed in a first inner loop is also accessed in a second inner loop, a total number of passes through the first inner loop equals a total number of passes through the second inner loop, it would be legal to fuse the plurality of inner loops into one loop if the inner loops were adjacent each other, a depth from the outer loop to the first inner loop equals a depth from the outer loop to the second inner loop in the candidate region, and there exists no loop carried dependence between the outer loop and the inner loops, wherein loop carried dependence includes read-after-write, write-after-read and write-after-write dependencies.

16. The apparatus of claim 13, wherein the candidate region is determined speculatively and further comprising generating a speculative version and an original version, corresponding to the candidate region.

17. The apparatus of claim 16, wherein generating the speculative version comprises:
- generating a speculative region placeholder for the candidate region, wherein the speculative region placeholder comprises a multi-version control code;
- generating a speculation guard comprising an expression; and
- updating the multi-version control code with the expression from the speculation guard if the expression is region invariant.

* * * * *